(12) United States Patent
Lowe et al.

(10) Patent No.: US 9,010,715 B2
(45) Date of Patent: Apr. 21, 2015

(54) MAST

(71) Applicant: V.I.T. Products, Inc., Escondido, CA (US)

(72) Inventors: George Truett Lowe, Ramona, CA (US); David Jesse Gove, Hayden, ID (US)

(73) Assignee: V.I.T. Products, Inc., Escondido, CA (US)

( * ) Notice: Subject to any disclaimer, the term of this patent is extended or adjusted under 35 U.S.C. 154(b) by 77 days.

(21) Appl. No.: 13/894,183

(22) Filed: May 14, 2013

(65) Prior Publication Data

US 2014/0339383 A1    Nov. 20, 2014

(51) Int. Cl.
*F16M 13/00* (2006.01)
*F16M 11/28* (2006.01)

(52) U.S. Cl.
CPC ..................................... *F16M 11/28* (2013.01)

(58) Field of Classification Search
CPC ........ A45B 11/00; F16M 13/02; G09F 17/00; H01Q 1/1221; H01Q 1/084; A01K 97/10; E04H 12/32
USPC ......... 248/544, 511, 514, 515, 516, 535, 540, 248/251; 40/606.15, 607.04; 116/173; 343/882
See application file for complete search history.

(56) References Cited

U.S. PATENT DOCUMENTS

| | | | | |
|---|---|---|---|---|
| 2,727,707 | A * | 12/1955 | Wells | 248/514 |
| 3,208,703 | A * | 9/1965 | Arnold et al. | 248/514 |
| 3,599,599 | A * | 8/1971 | Jones | 116/173 |
| 3,889,908 | A * | 6/1975 | Larson | 248/515 |
| 4,687,168 | A * | 8/1987 | Rupp | 248/539 |
| 4,920,681 | A * | 5/1990 | Toliver et al. | 43/21.2 |
| 5,544,851 | A * | 8/1996 | Moore | 248/544 |
| 6,232,928 | B1 * | 5/2001 | Zimmerman et al. | 343/882 |
| 6,253,497 | B1 * | 7/2001 | Gekler et al. | 52/27 |
| 6,533,237 | B1 * | 3/2003 | Matusek | 248/514 |
| 7,228,814 | B1 * | 6/2007 | Williams, Sr. | 116/173 |
| 8,130,168 | B1 * | 3/2012 | Sergi et al. | 343/882 |
| 2011/0260029 | A1 * | 10/2011 | Kost | 248/514 |

* cited by examiner

*Primary Examiner* — Bradley Duckworth
(74) *Attorney, Agent, or Firm* — Knobbe Martens Olson & Bear LLP (57) ABSTRACT

This disclosure relates to a mast having an elongated arm movable between a deployed position and a service position. The elongated arm is attached by a rotatable hub. A receiver is spaced from the hub and configured to selectively prevent rotation of the mast.

31 Claims, 12 Drawing Sheets

MAST

BACKGROUND OF THE INVENTION

1. Field of the Invention

This disclosure relates to a mast having an elongated arm movable between a raised, deployed position and a lowered, service position. The elongated arm is attached to a rotatable hub which is connected to a base. A receiver is spaced from the hub and configured to selectively prevent rotation of the mast towards the service position.

2. Description of the Related Art

The invention relates to a rotary mounting apparatus for the kinds of mast that are used, for example, in the reception and transmission of wireless signals, installation of solar panels, signs, utility devices, and the like. The invention may be applied to mast mountings in which, to install and maintain, the upper portion of the mast has to be accessed by a service technician while maintaining a sufficient vertical position for proper positioning. An exemplary use is such as to receive and transmit wireless signals. Such masts are used, for example, adjacent to railroads and highways.

In the past, mast, such as antenna masts, were initially expensive to install and were subsequently costly to maintain due to their heavy and bulky construction. Antenna mast installations utilized metal support trusses which were anchored to the ground and required two or more service technicians to install the antenna mast or remove the antenna mast when it was serviced. When the antenna mast needed service, a cherry picker would often be employed to reach the antenna. Because of the weight of the antenna mast and associated hardware, once the antenna mast was unsecured from the supporting trusses, the unbalance antenna could cause the mast to rapidly fall or tumble from its vertical position. Previous types of antenna mast mechanisms required ancillary means, such as, additional service technicians or purpose built tools, in order to prevent the antenna mast from dropping suddenly and causing damage to the remaining antenna assembly and/or service technician.

Accordingly, there is a need for an improved mast that is easy to install and service while providing sufficient vertical positioning for optimum reception and transmission of wireless signals, installation of solar panels, signs, utility devices, and the like.

SUMMARY OF THE INVENTION

The devices of the present invention have several features, no single one of which is solely responsible for its desirable attributes. Without limiting the scope of this invention as expressed by the claims which follow, its more prominent features will now be discussed briefly. After considering this discussion, and particularly after reading the section entitled "Detailed Description of the Preferred Embodiments," one will understand how the features of this invention provide several advantages over current designs.

One embodiment is an apparatus for mounting a device that includes a base configured to be secured to a supporting surface and having a hub and a receiver spaced from the hub and a mast secured to the hub and being configured to support the device, the mast being rotatable about the hub between a deployed position and a service position, a portion of the mast being securable to the receiver when the mast is in the deployed position and being spaced from the receiver when the mast is in the service position.

Another embodiment is an apparatus for mounting a device that includes a base configured to be secured to a supporting surface, a mast rotatably secured to the base and being configured to support the device, the mast being rotatable relative to the base between a deployed position and a service position, and an engagement structure disposed on the base and being selectively engageable with the mast when the mast is in the deployed position.

Another embodiment is an apparatus for mounting a device that includes a generally planar base having a first side and a second side, the first side being configured to be secured to a supporting surface, a mast rotatably secured to the second side of the base and being configured to support the device, and a lock disposed on the second side of the base and being selectively engageable with the mast so as to prevent rotation of the mast relative to the base.

Another embodiment is an apparatus for mounting a device that includes a base having a first side, a rotatable component being secured to the base at a point and being configured to support a device, and a non-rotatable component being secured to the base and configured to lock the rotatable component relative to the base, the rotatable component and the non-rotatable component being disposed so that each may be assembled to the first side of the base, the non-rotatable component being disposed on the base so as to receive an intermediate portion of the rotatable component along the length of the rotatable component.

Further aspects, features and advantages of the present invention will become apparent from the detailed description that follows.

BRIEF DESCRIPTION OF THE DRAWINGS

These and other features, aspects, and advantages of the present invention will now be described in connection with embodiments of the present invention, in reference to the accompanying drawings. The illustrated embodiments, however, are merely examples and are not intended to limit the invention. Some embodiments will be described in conjunction with the appended drawings, where like designations denote like elements.

DETAILED DESCRIPTION OF THE PREFERRED EMBODIMENTS

The following detailed description is directed to certain specific embodiments of the invention. However, the invention can be embodied in a multitude of different ways as defined and covered by the claims. In this description, reference is made to the drawings wherein like parts are designated with like numerals throughout.

With reference to FIGS. 1-7, there is shown a mast assembly 20 according to a preferred embodiment of the present invention. FIGS. 1A and 1B illustrate the mast assembly 20 in a deployed or raised position. The mast assembly 20 can be mounted to a fixed supporting surface 22, for example, a base station. The base station can be located near a train track so as to provide wireless services to the train or passengers.

In certain embodiments, the mast assembly 20 includes a base 24 and a mast 30. The mast may be an elongated member constructed of a tubular metal material and having a generally circular cross-section. The mast 30 may be manufactured out of a metal, plastic, or other material that can withstand the expected structural loading during deployment. The structural loading may vary depending on, for example, the scale of the mast 30, the expected weather conditions at the location of deployment, and any transitory environmental loading. Transitory environmental loading may be caused by wind due to the proximate passage of a vehicle such as a train. In certain embodiments, the mast 30 is formed of rigid pipe stock. It should be appreciated, however, that the mast 30 may be constructed in various shapes and of various materials of suitable strength for supporting a device 31 such as an antenna mounted to an end of the mast 30.

The mast 30 may include one or more portions which are fixed together to form the mast 30. The mast portions may be releasably or permanently fixed together via threads, welding or the like. An advantage of a multi-piece mast 30 is the mast 30 can be collapsed or disassembled for ease of transportation or shipping.

Figure 1A:
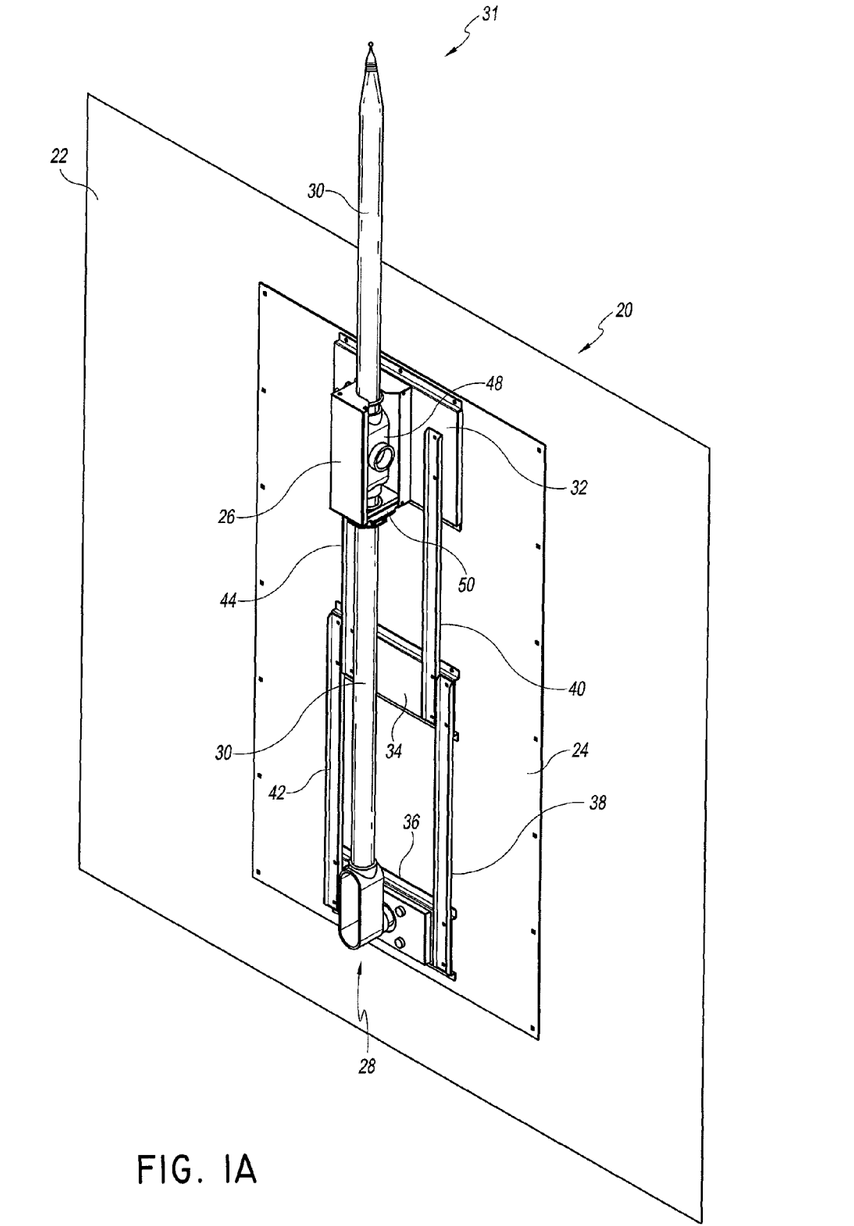
FIG. 1A illustrates an embodiment of a mast assembly according to a preferred embodiment of the present invention.

Another end of the mast 30 is mounted to the base 24 via a hub assembly 28, as will be described in more detail herein. As mentioned above, the supporting surface 22 to which the mast assembly. 20 is mounted may be, for example, a kiosk, a structure (as shown in FIG. 1A, and for example a wall thereof), other types of buildings, a pole, a tower or a tree, etc. The mast assembly 20 is particularly well suited for placement on structures adjacent to railroad tracks and where access to the device 31, such as an antenna, for installation and servicing may be necessary following attachment of the mast assembly 20 to the supporting surface 22.

In certain embodiments, the portions of the mast 30 directly connect end-to-end or via a spacer or other linking structure. In the illustrated embodiment the mast 30 comprises two tubular portions connected by a junction box 48. Advantageously, the junction box 48 provides an access point through the wall of the mast 30 for attachment of one or more devices and or to access wiring in the mast 30. In some embodiments, a solar panel or other power producing device is attached to the junction box 48. The junction box 48 further provides a location along the length of the mast 30 for securing the mast 30 in the receiver 26.

The outer shape of the junction box 48 can be selected to generally match the inside shape of the receiver 26. In this way, the junction box 48 can achieve a more secure fit in the receiver 26 which may steady the device 31 relative to the base 24 when the mast 30 is in the deployed position. Of course in certain embodiments the mast 30 does not include the junction box 48. In such embodiments, a portion of the tubular body of the mast 30 can be secured within the receiver 26.

The mast 30 and junction box 48 can be integrally formed to comprise a unitary mast assembly. This can be accomplished in any of a variety of ways well known to those skilled in the art. As is illustrated, the mast assembly, however, comprises a non-unitary structure. In this manner, the junction box 48 and one or more mast portions are formed separately and then coupled together. Additionally, the junction box 48 and mast 30 can have other forms and can have other orientations relative to one another.

The receiver 26 can arrest undesired movement of the device 32 via engagement with the junction box 48. This engagement can arrest movement of the mast 30. In certain implementations, this engagement prevents movement in lateral and transverse directions relative to a central axis through the mast 30 as well as rotation when the junction box 48 is disposed in the receiver 26.

In certain embodiments, rotation in both directions is prevented once the junction box 48 is disposed in the receiver 26 and one or more mast fasteners 54 are assembled about the mast 30 in the receiver 26. In certain embodiments, arm 50 is rotated to close an entrance to the receiver 26 and further inhibit rotation. In certain implementations, the arm 50 is used to hold the mast 30 when the mast 30 is initially rotated to the deployed position until the mast fasteners 54 can be installed as will be described below.

Figure 4:
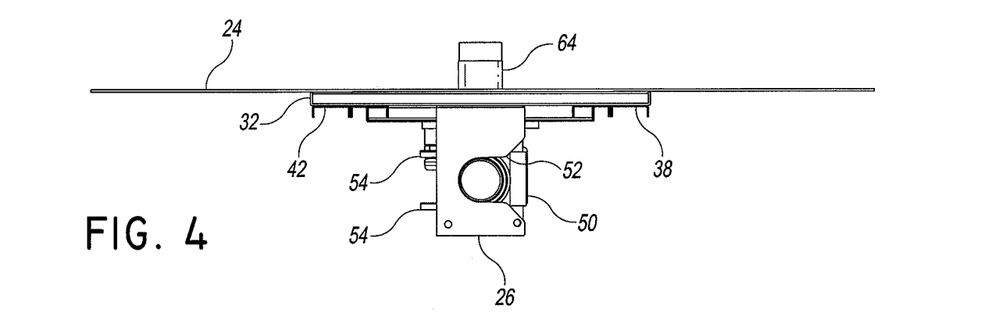
FIG. 4 is a top view of the mast assembly illustrated in FIG. 1B.
Figure 5:
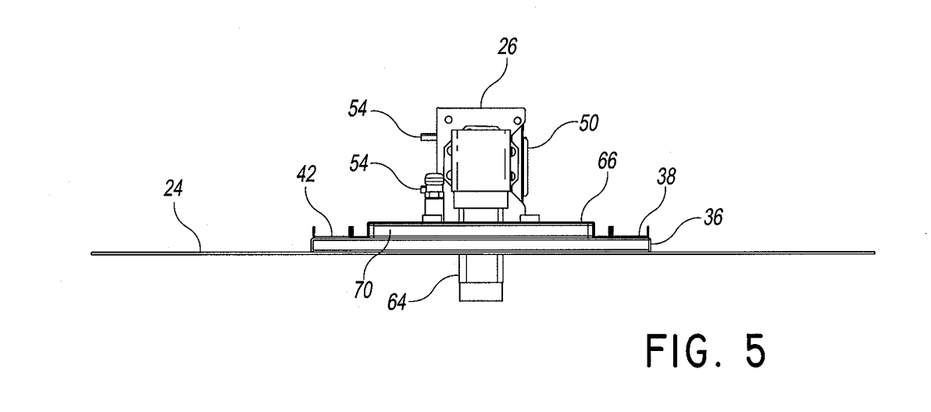
FIG. 5 is a bottom view of the mast assembly illustrated in FIG. 1B.

FIG. 4 is a top view of the mast assembly 20. FIG. 5 is a bottom view of the mast 20 illustrated in FIG. 1B and shows the arm 50 in a locked position to prevent rotation of the mast 30 back to the service or lowered position. The mast assembly 20 and receiver 26 are shown in additional detail. The receiver 26 can include a generally rigid structure due both in part to the material used to form the receiver 26. Suitably rigid materials include, for example, but without limitation: metals, plastics, polymers or composites and the like. However, other materials can be utilized. The receiver 26 also can be clear or transparent to facilitate alignment of the receiver 26 with the mast 30 during installation.

Figure 1B:
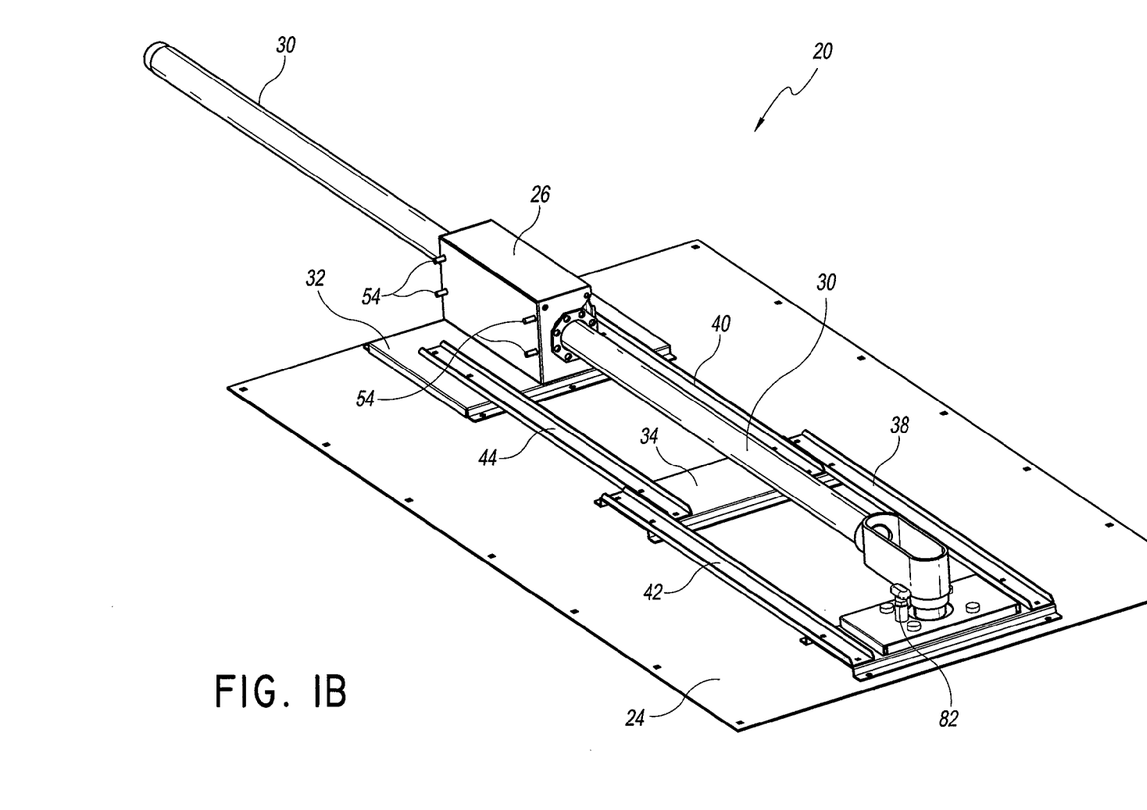
FIG. 1B is a front side isometric view of the mast assembly illustrated in FIG. 1 when in a deployed or raised position with the antenna removed.
Figure 2:
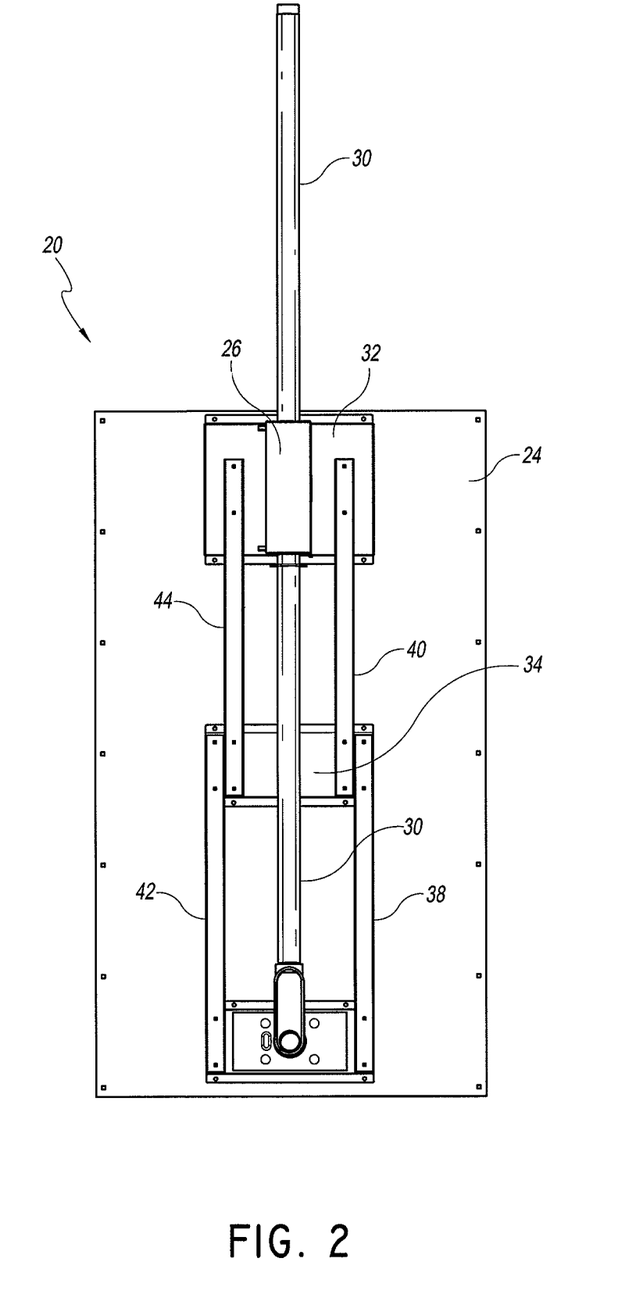
FIG. 2 is a front view of the mast assembly illustrated in FIG. 1B.
Figure 3:
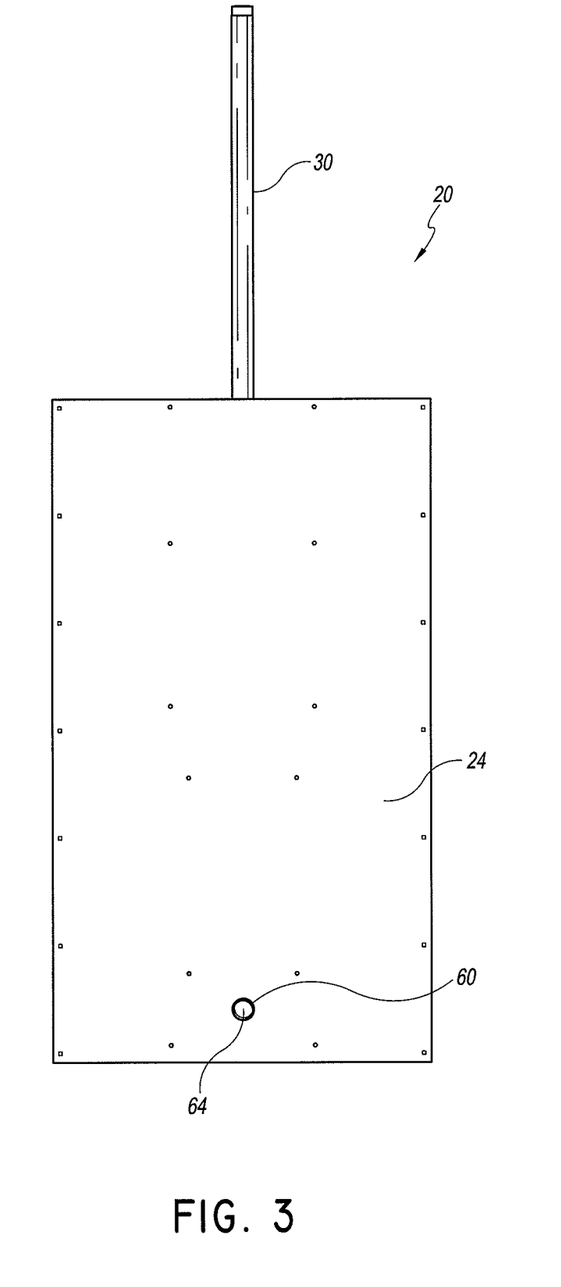
FIG. 3 is a back view of the mast assembly illustrated in FIG. 1B.
Figure 6:
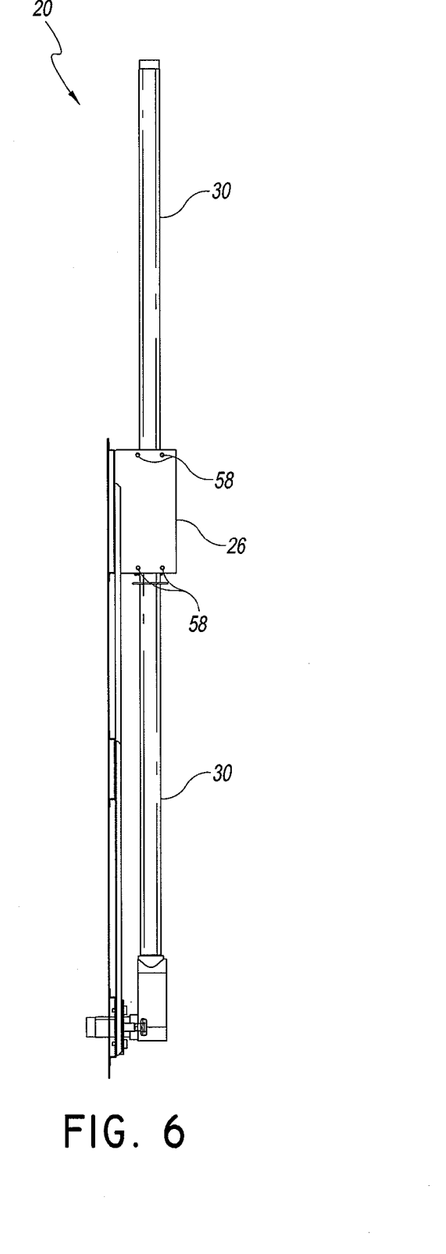
FIG. 6 is a left side view of the mast assembly illustrated in FIG. 1B.
Figure 7:
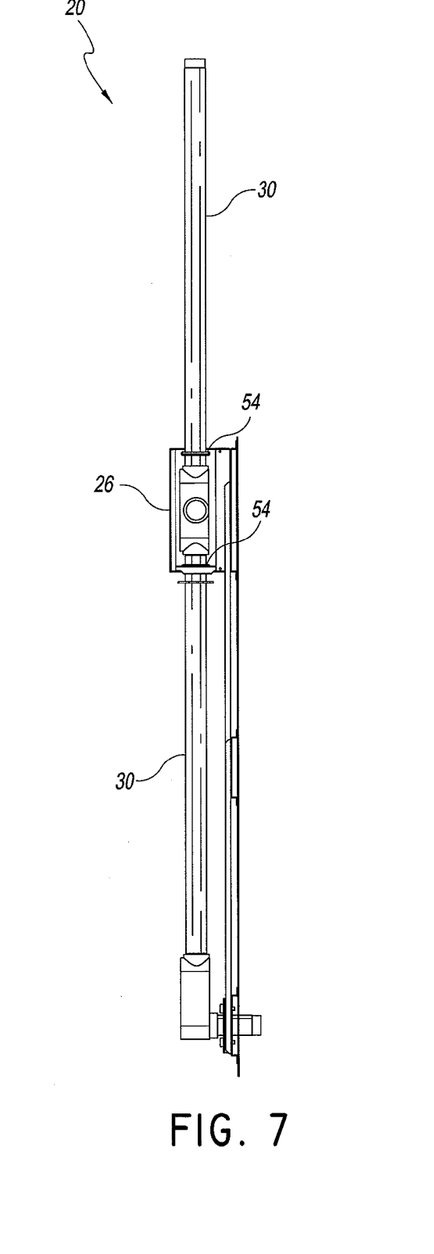
FIG. 7 is a right side view of the mast assembly illustrated in FIG. 1B.

FIG. 6 is a left side view of the mast assembly 20 illustrated in FIG. 1B. FIG. 7 is a right side view of the mast assembly 20 illustrated in FIG. 1B. The receiver 26 is elongated in the longitudinal direction which is parallel to the central axis of the mast 30 when the mast 30 is in the deployed position. The receiver 26 has a generally rectangular shape. It is advantageous for the longitudinal dimension of the receiver 26 to be sufficiently long to provide stability to the retained portion of the mast 30 along its length as well as to accommodate fasteners and the like. In this way, the longitudinal length of the retained portion is sufficient to inhibit rocking of the mast 30 within the receiver 26. Also, the lateral or width dimension of the receiver 26 desirably allows the technician to easily and naturally grip the receiver 26 when rotating the mast 30 to the deployed position. In certain embodiments, one or more handles or grips are included on the mast assembly 20 for a technician to grasp while raising or lowering the mast 30.

With reference to FIG. 4, a bottom side of the receiver 26 faces towards the base 24 and preferably defines a side-opening central passageway 52. The passageway 52 extends through the receiver 26 in a longitudinal direction for receiving a section of the mast 30 in the illustrated embodiment. The passageway 52 is capable of receiving a portion or length of the mast 30 such as the junction box 48 and is generally configured to house, to preferably grip, and to secure this portion of the mast 30. In the illustrated embodiment (see FIG. 8A), the passageway 52 has a generally semi-circular cross-sectional shape. An inner surface contour of the passageway 52 preferably is selected depending on the geometry of the portion of the mast 30 to be retained. For example, for a receiver 26 that is configured to retain a portion of a mast 30 that has a constant outer diameter, the passageway 52 preferably has a constant radius along its length. For example, where the mast 30 passes through the end walls of the rectangular receiver 26 the passageway 52 can have the same radius as the mast 30.

In contrast, for a receiver 26 configured to retain a portion of the mast 30 that has a varying outer surface such as a junction box 48, the passageway 52 preferably has a shape that varies along the passageway length. For example, the size of the passageway 52 illustrated in FIG. 8A changes from a semi-circular cross-sectional shape to a rectangular shape and then back to a semi-circular cross-sectional shape along the length of the receiver 26. Additional embodiments of the passageway 52 of the receiver 26 can comprise a plurality of different radii, tapering, and/or stepped regions. For example, the passageway 52 can have two sections: a first section that has a generally uniform cross-sectional size along its length while a second section has a rectangular shape along its length. In this way, the size and shape of the passageway 52 can be chosen to match or to approximate the size and shape of the mast 30 or portion thereof, e.g., the junction box 48, to be retained. By generally matching the inner surface contour of the passageway 52 to the outer surface of the secured portion of the mast 30, a more effective securement may be achieved. In addition or in the alternative, effective securement can also be achieved by the engagement of one or more fasteners 54, such as u-bolts, and/or the arm 50 of the receiver 26 with an outer surface of the mast 30. Each fastener 54 and/or arm 50 can cooperate with an outer surface on the mast 30 to inhibit movement of the mast 30 relative to the receiver 26 in at least one direction.

Although the passageway 52 can be formed in various shapes depending upon the desired application (e.g., depending upon a shape of the retained portion of the mast 30 for which the receiver 26 is designed to be used), the passageway 52 desirably has a sufficient length in the longitudinal direction to stabilize the mast 30.

Figure 8A:
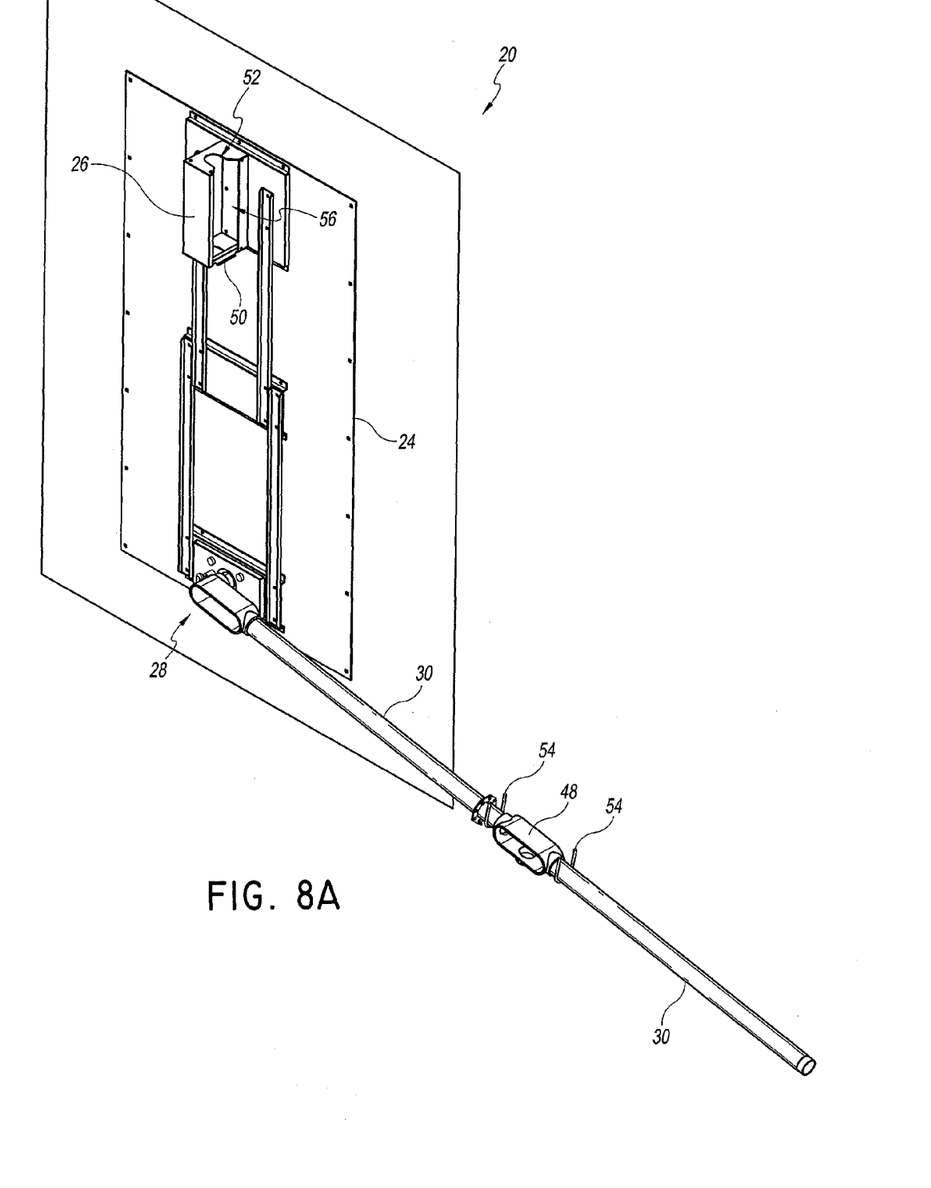
FIG. 8A is a perspective view similar to FIG. 1A except the mast is in a service or lowered position.

As shown most clearly in FIG. 8A, the side of the receiver 26 includes an access or side opening 56. In some embodiments, the side opening 56 has generally curvilinear sides along the longitudinal axis to match generally the shape of the junction box 48. In other embodiments as is illustrated in FIG. 8A, the side opening 56 has generally parallel sides while the passageway 52 matches generally the shape of the junction box 48. The side opening 56 may include contouring (e.g., chamfers) along, its periphery in order to guide the junction box 48 into the passageway 52 when inserting the mast 30 into the receiver 26.

The illustrated receiver 26 further comprises a retention structure disposed so as to prevent the mast 30 from being removed from the side opening 56 of the passageway 52. The retention structure holds at least a portion of the retained mast 30 within the passageway 52. This support can be provided by, for example, the engagement of the one or more mast fasteners 54 and/or arm 50 of the receiver 26 with an outer surface of the mast 30 and/or a snap-fit connection between the mast 30 and the receiver 26.

In certain embodiments, the support can be provided by the surfaces of the passageway 52 to hold the mast 30 within the receiver 26. The surfaces of the passageway 52 can provide a degree of snap fit between the receiver 26 and the mast 30. The degree of snap-fit can be increased by extending the overall surface of the passageway 52 through an arc of greater than 180°. However, as shown most clearly in FIG. 4, the arc in the illustrated embodiment extends for approximately 180°. For arcs greater than 180°, the length of the arc provides a snap-fit securement between the passageway 52 and the secured portion of the mast 30. In this way, the mast 30 can be placed in the deployed position prior to attaching the mast fasteners 54 and/or moving the arm 50 of the receiver 26 without concern that the mast 30 will shift while the technician is attaching the one or more mast fasteners 54 and/or moving the arm 50. Additionally, the releasable engagement provided by a snap-fit connection also permits the retained portion of the mast 30 to be readily released from receiver 26.

Referring to FIG. 8A, the mast assembly 20 also includes one or more mast fasteners, generally designated by reference number 54. The mast fasteners 54 are essentially identical to one another. The mast fasteners 54 provide a means for affixing the mast 30 to the receiver 26. As most clearly shown in FIG. 6, a side of the receiver 26 opposite to the opening 56 included one or more apertures 58 for receiving ends of the mast fasteners 54 such as the ends of a u-shaped bolt.

Each mast fastener 54 includes a body having a first end, a second end and a central portion therebetween. The central portion preferably has a shape that is complimentary to a shape of the mast 30 in order to best accommodate receipt of the mast 30 in the receiver 26. As shown in the drawings, the central portion may have a semi-circular shape to accommodate the mast 30 having a generally circular cross-section.

The mast fasteners 54 are releasably secured to the receiver 26 by extending the first and second ends of the mast fastener 54 through the one or more apertures 58 formed in the receiver 26. Cooperating nuts are provided for tightening and untightening of the mast fastener 54 to the receiver 26 thereby securing the mast 30 in place.

Figure 8B:
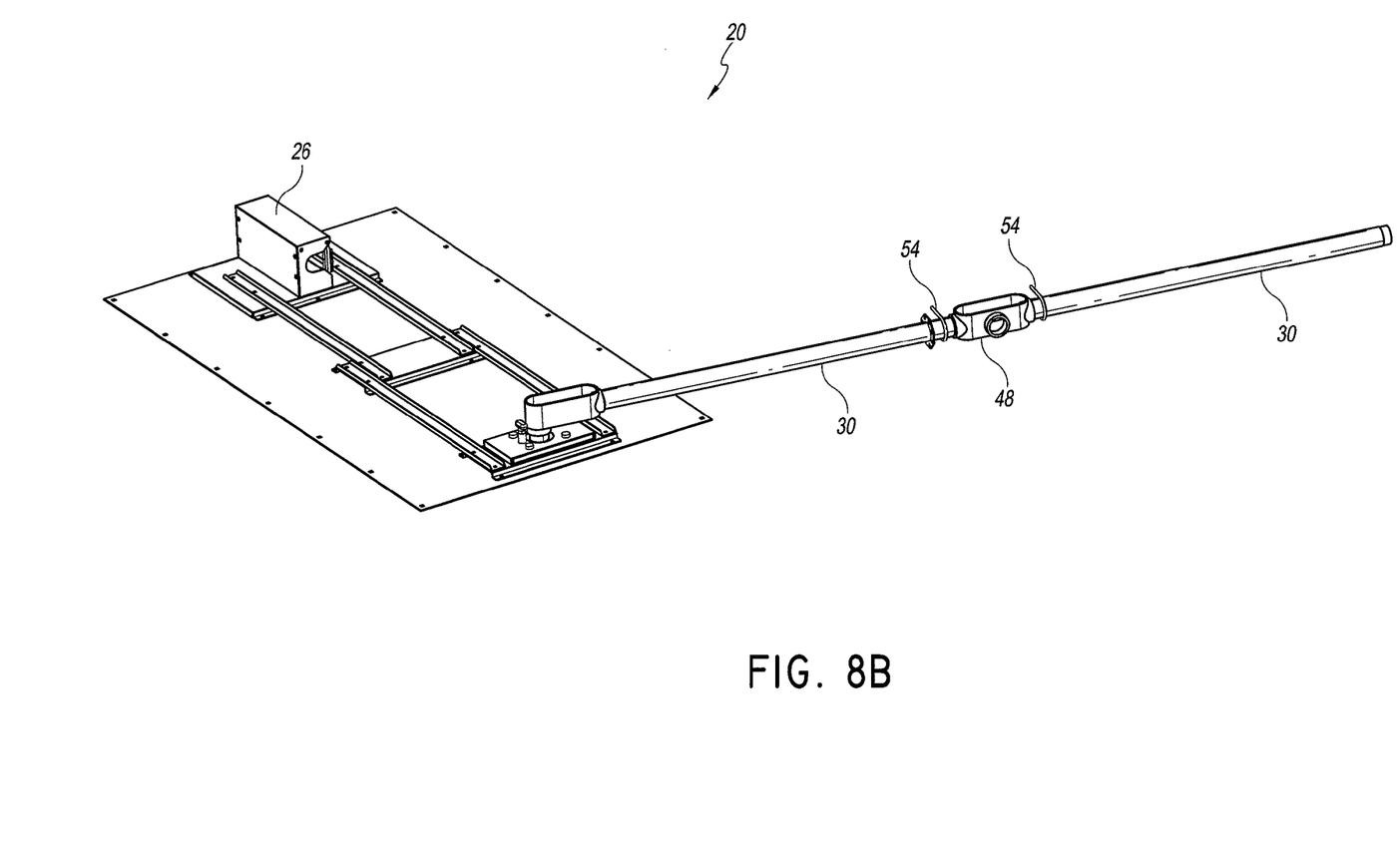
FIG. 8B is a front side perspective view similar to FIG. 1B except the mast is in a service or lowered position.
Figure 9:
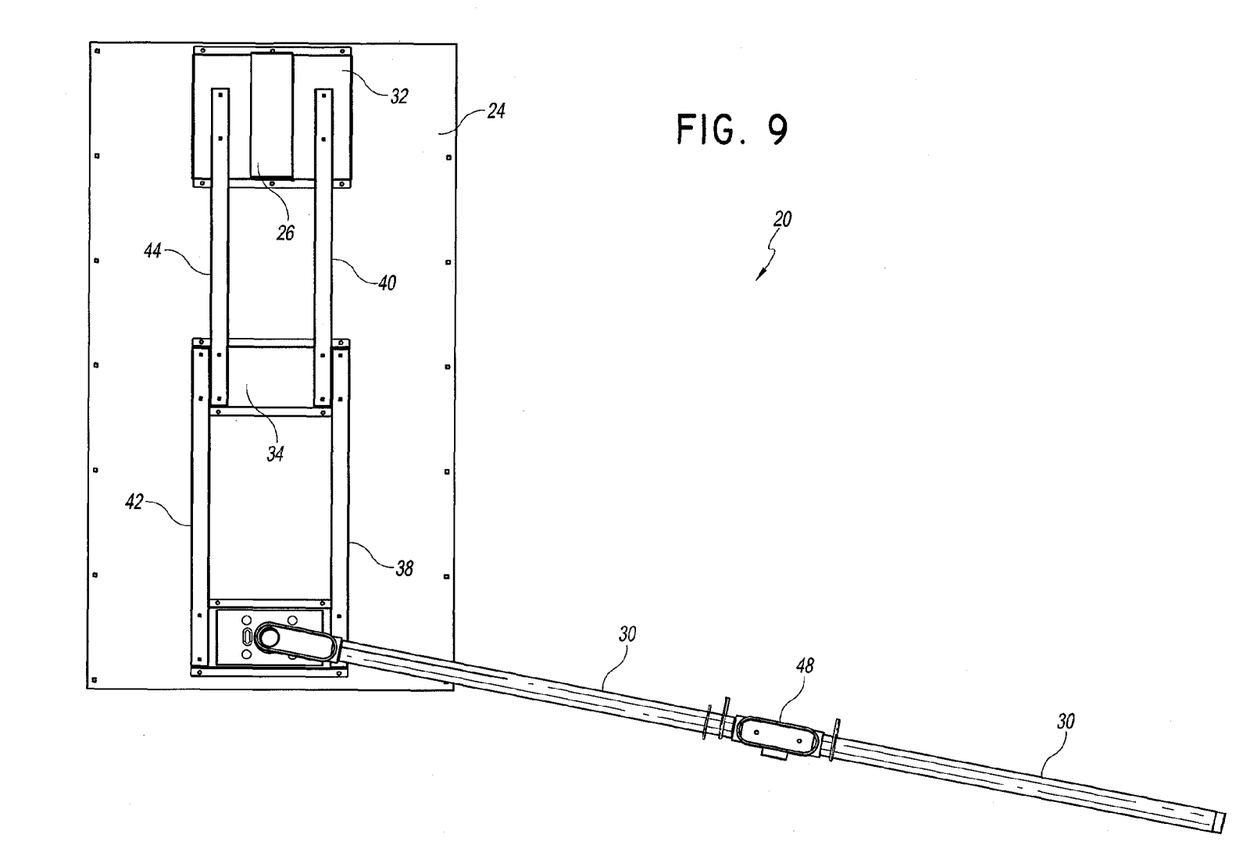
FIG. 9 is a front view similar to FIG. 2 except the mast is in a service or lowered position.

FIG. 8A is a perspective view similar to FIG. 1A except the mast 30 is in a service or lowered position. FIG. 8B is a front side perspective view similar to FIG. 1B except the mast 30 is in a service or lowered position. FIG. 9 is a front view similar to FIG. 2 except the mast 30 is in a service or lowered position. With reference to FIGS. 1A, 1B, 8A, and 9A, the mast assembly 20 is shown in additional detail when in the service position. Specifically, the mast assembly 20 includes one or more platforms 32, 34, 36 that are directly attachable to the base 24 and one or more guide rails 38, 40, 42, 44 directly attachable to the platforms 32, 34, 36. In the illustrated embodiment, the one or more platforms include an upper platform 32 configured to be secured between the receiver 26 and the base 24. A lower platform 36 is disposed between the hub assembly 28 and the base 24. In the illustrated embodiment, the lower platform 36 includes an opening 60 for a portion of the hub assembly 20 to pass therethrough as will be described below with respect to FIG. 10.

An intermediate platform 34 is disposed between the upper and lower platforms 32, 36 and provides a common attachment location for the inner ends of the guide rails 38, 40, 42, 44. While three platforms 32, 34, 36 are illustrated in FIGS. 1A, 1B, 8A, and 9A, more or less platforms could be used without departing from the scope of the invention. Having multiple platforms 32, 34, 36 facilitates stacking and or packaging the platforms 32, 34, 36 in a smaller container than if a single platform was utilized. Of course the multiple platforms 32, 34, 36 need not be entirely separate and instead could be hinged or mechanically linked in a manner which would still provide the attachment locations for the guide rails 38, 40, 42, 44 while allowing a small package for shipment or packaging. Each platform 32, 34, 36 includes apertures extending therethrough for receipt of fasteners which may be, for example, wood screws, metal screws, bolts or nails depending upon the composition of the structures to be connected. The fasteners attach the platform 32, 34, 36 to the base 24 as is known to a person having skill in the art.

More or less guide rails 38, 40, 42, 44 could be utilized and still provide the strength and rigidity required to support the mast 30. In certain implementations, each pair of guide rails 38, 40 and 42, 44 are formed from a single telescopic rail which moves between a contracted length and an extended length. In the illustrated embodiment each guide rail 38, 40, 42, 44 is independently securable to the platforms 32, 34, 36.

Each guide rail 38, 40, 42, 44 includes apertures extending therethrough for receipt of fasteners which may be, for example, wood screws, metal screws, bolts or nails depending upon the composition of the structures to be connected. The fasteners attach the guide rails 38, 40, 42, 44 to the platforms 32, 34, 36 as is known to a person having skill in the art. Of course the guide rails 38, 40, 42, 44 could share common fasteners with the platforms 32, 34, 36 and still fall within the scope of the invention. For example, the inner ends of the guide rails 38, 40, 42, 44 could overlap over the intermediate platform 34 to allow a single fastener for each pair of the guide rails 38, 40 and 42, 44. In certain implementations, the guide rails 38, 40, 42, 44 are essentially identical. Each guide rail 38, 40, 42, 44 has a u-shaped channel along their longitudinal axes to provided additional rigidity over a planar cross-sectional shape.

Figure 10:
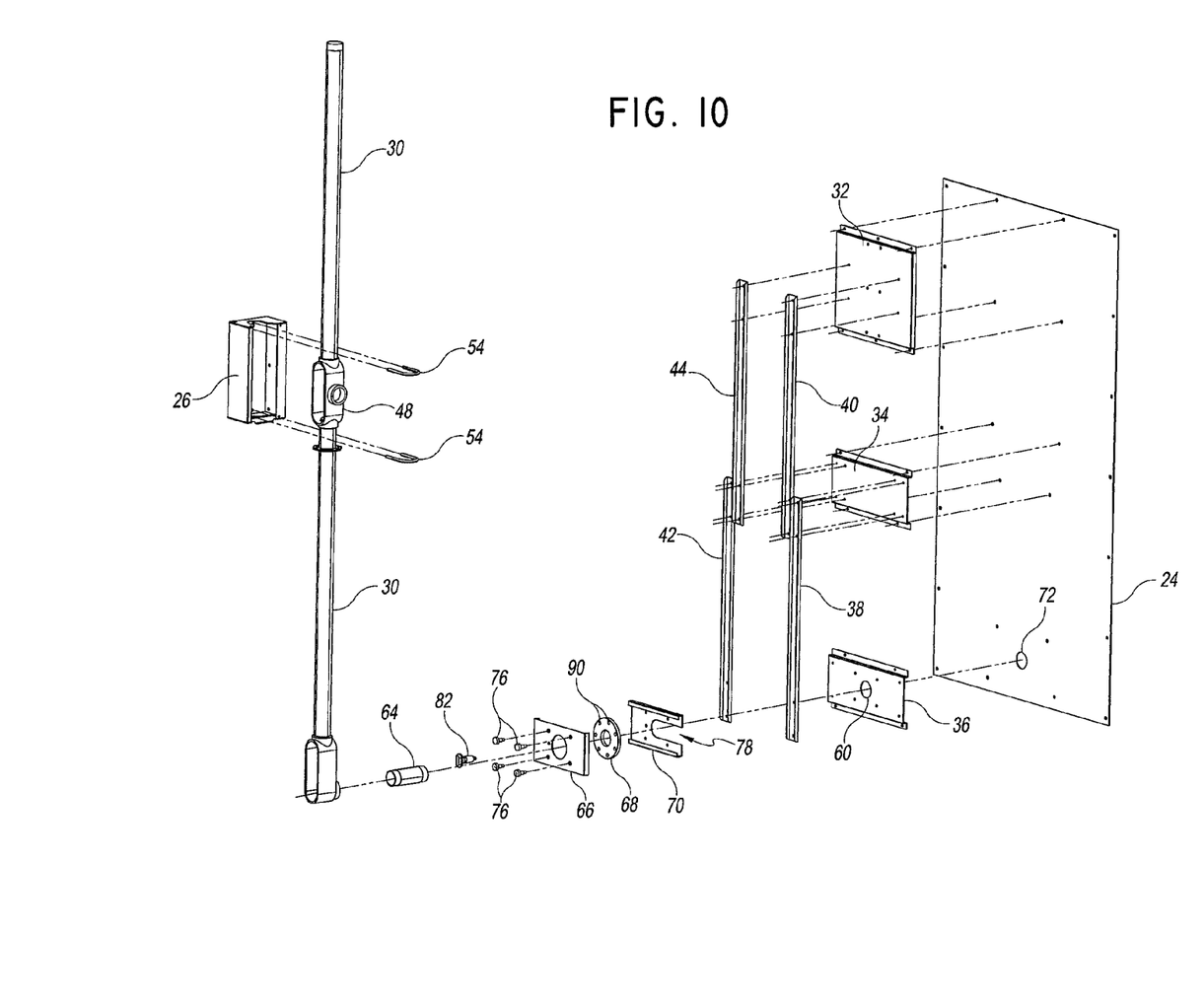
FIG. 10 is an exploded perspective view of the mast assembly illustrated in FIG. 1B.
Figure 11:
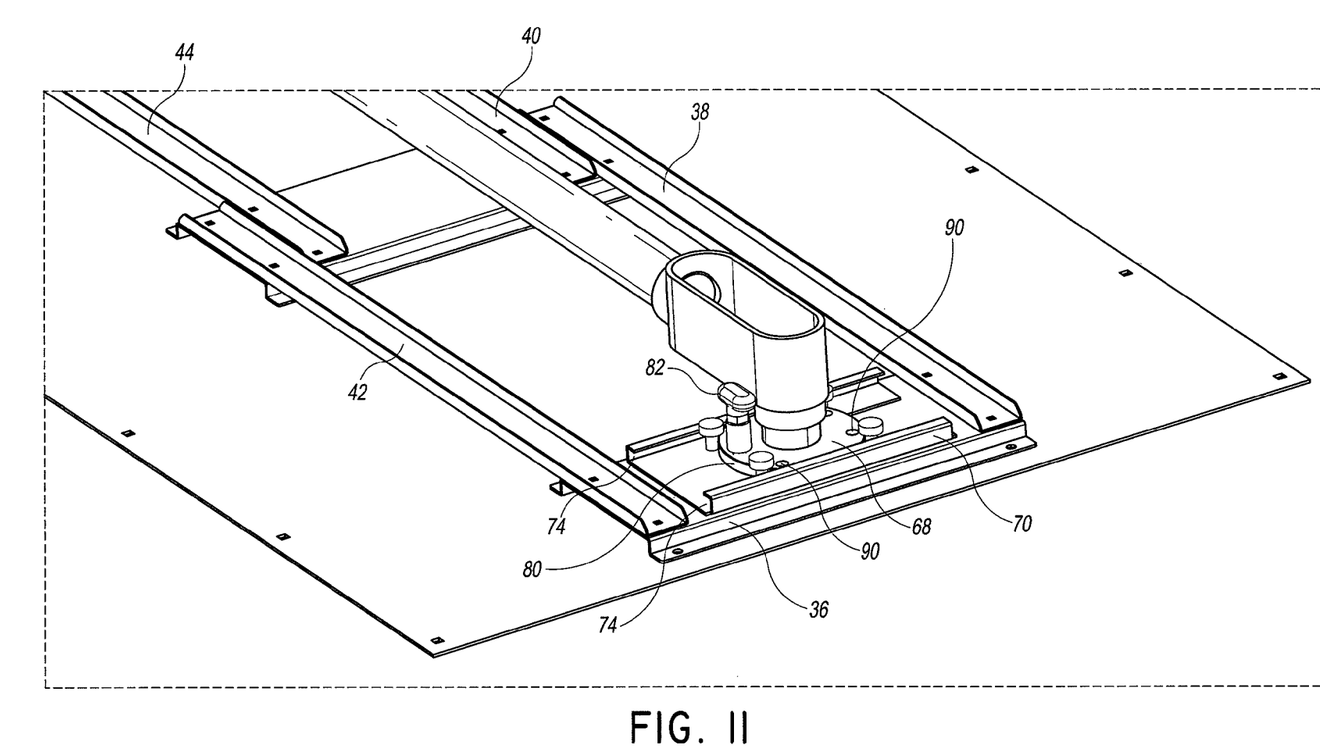
FIG. 11 is a close-up view of a hub assembly from FIG. 1A with a plate removed to expose a hub.

FIG. 10 is an exploded perspective view of the mast assembly 20 illustrated in FIG. 1A. FIG. 11 is a close-up view of a hub assembly 28 from FIG. 1A with a plate 66 removed to expose a hub 68. As most clearly shown in FIGS. 10 and 11, the hub assembly 28 comprises a shaft 64, the plate 66, the hub 68, and a channel member 70.

The shaft 64 has a generally cylindrically outer profile and engages the mast 30 so as to allow the mast 30 to rotate relative to the base 24. In the illustrated embodiment, an end of the shaft 64 is secured to the mast 30 and the other end of the shaft 64 is secured to at least the hub 68. For example, the ends of the shaft 64 could be welded, swaged, glued, threaded, or otherwise fixed to the mast 30 and the hub 68 so that the mast 30, shaft 64, and hub 68 rotate in unison when the mast 30 is moved between the service and deployed positions.

The hub 68 and the channel member 70 are positioned adjacent to each other. The hub 68 is configured to rotate while the channel member 70 is preferably stationary. The channel member 70 and hub 68 are preferably generally planar plates that are positioned generally parallel to each other. This conveniently allows for movement of the hub 68 with respect to the channel member 70. It will be appreciated, however, that the channel member 70 and hub 68 may be shaped and configured, other than as shown and described herein, for relative movement to one another in accordance with the present invention.

In the illustrated embodiment, the end of the shaft 68 passes through the plate 66 before passing into the hub 68. The shaft 64 further extends through the channel member 70, and openings 60, 72. In this way, the plate 66, channel member 70, lower platform 36, and base 24 provided bearing surfaces against which the shaft 64 can rotate when the mast 30 is rotated between the service and deployed positions. In certain embodiments, the shaft 64 includes one or more bearings disposed so as to rotate about the central axis of the shaft 68. In other embodiments, bearings are press-fit into one or more of the plate 66, channel member 70, lower platform 36, and base 24.

The shaft 64 may be made of any suitable material, preferably metal, that can support the mast 30 when deployed and has a sufficient cross-sectional size to withstand torsional loading due to the rotation of the mast 30. In certain implementations, the shaft 64 may be made from a solid or hollow tubular structure.

In certain embodiments, a ball joint is utilized between the mast 30 and the shaft 64 so as to allow the mast 30 to move in additional directions. For example, the mast 30 can move freely in two planes at the same time, including rotating in those planes, in implementations that include a ball joint between the mast 30 and the shaft 64.

Referring to FIG. 11, the upper and lower sides of the channel member 70 defines opposing grooves 74. An outer perimeter of the hub 68 defines a corresponding contact surface 80 for the inside of the grooves 74. The grooves 74 are preferably generally linear. However, other groove 74 configurations may be successfully employed in accordance with the disclosure.

The grooves 74 each may have an appropriate length and cross-sectional shape to provide for suitable rotational movement of the hub 68 with respect to the channel member 70, such as, for example movement of the hub 68 through an angle of generally 90 degrees (see FIGS. 8A-9) in at least one direction from alignment with respect to the channel member 70. Of course, movement through an angle greater than or less than 90 degrees may be employed.

As most clearly shown in FIG. 10, the channel member 70 further comprises slot 78. The grooves 74 are sized and shaped to slidingly receive the hub 68 during assembly in a direction parallel to the grooves 74. The slot 78 in the channel member 70 allows a preassembled shaft 64 and hub 68 to be slid through the grooves 74 even when the shaft 64 extends past the back of the hub 68. Preferably the shaft 64 extends beyond the back of the hub 68 in a direction towards the base 24 so as to allow the channel member 70, lower platform 36, and base 24 to support rotation of the shaft 64 as explained above. Of course the shaft 64 need not extend beyond the hub 68 and still fall within the scope of the disclosure. Further, the assembly process could be modified so that the shaft 64 is inserted through the channel member 70 in a direction parallel to the axis of the shaft 64. In this manner, the slot member 78 could instead be a closed hole in the channel member 70 or removed entirely if the shaft 64 need not extend through the channel member 70.

With the hub 68 located in the grooves 74, the plate 66 is secured to the channel member 70 and lower platform 36 via one or more hub bolts 76. The hub bolts 76 prevent the hub 68 from sliding back out of the grooves 74 in the channel member 70 while allowing the hub 68 to rotate within the grooves 74. In this way, the hub bolts 76 limit lateral movement of the shaft 64 while allowing rotation of the shaft 64. Movement in a direction towards the shaft 30 is prevented by the grooves 74. In certain implementations, the hub bolts 76 further attach to the lower platform 36.

In certain embodiments, the hub bolts 76 have one or more bearings disposed so as to rotate about a longitudinal axis of the bolt 76. In this way, the contact surface 80 on the hub 68 can bear against the outer surface of the bearing to allow smoother rotation of the hub 68. Of course bearings could be incorporated at different locations and still provided smoother rotation than implementations of the hub assembly 28 that do not include bearings.

In certain embodiments, the hub bolts 76 are carriage bolts. The hub 68 is releasably attached or locked to the channel member 70 by the carriage bolts 48 and cooperating nuts and washers. More specifically, a carriage bolt can extend through the plate 66, the hub 68, channel member 70 and lower platform 60. When the nuts are in an untightened position, the hub 68 can be slid with respect to the channel member 70. It will be appreciated that once the nuts are in a tightened position, the hub 68 is unable to slide out of the channel member 70. The lower platform 36 is attached to the base 24 by one or more fasteners as mentioned above.

As illustrated in FIGS. 4 through 7, the base 24 of the mast assembly 20 can have a planar shape when viewed from its sides. In certain implementations, the base 24 has a curved shape. The degree of curvature can be varied depending on the expected location of usage or application of the mast assembly 20. It will be appreciated that common sites for attachment of the mast assembly 20 will be located on regions exhibiting convex curvature, such as a pole or the like, etc. By providing a concave bottom profile to the base 24, the receiver 26 will be more stable once installed.

Typically, it is necessary that the mast 30 be positioned with a generally vertical orientation to ensure proper operation of the device 31, when configured as an antenna that is attached thereto. It will be appreciated, however, that in situations where the mast assembly 20 is to be adjusted, positioned, and/or have the attached devices such as antennas, solar panels, and the like serviced, the mast 30 is rotated from the deployed position to the service position without the need for a crane or the like.

FIG. 11 shows the rotating hub 68 directly overlying the channel member 70. FIGS. 1A and 8A illustrate rotatable or angular movement of the mast 30 and hub 68 with respect to the channel member 70. Once the base 24 is secured to the supporting surface 22, the mast 30 is secured to the hub 68. Specifically, the lower end of the mast 30 is positioned over the shaft 64 and then fixed to the shaft 64 to secure the mast 30 to the hub 68.

Figure 12A:
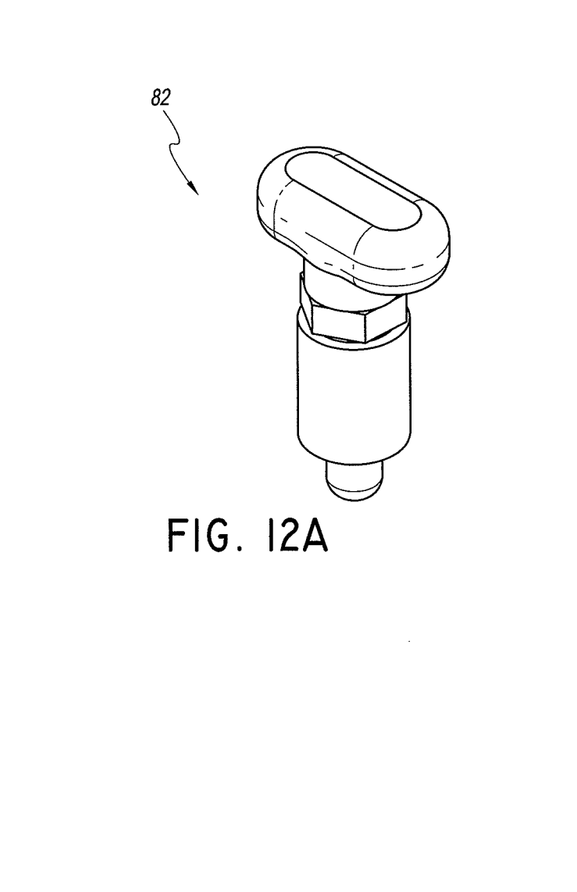
FIG. 12A is a detail view of a rotatable pin assembly from FIG. 11 that locks the mast in a desired radial position.
Figure 12B:
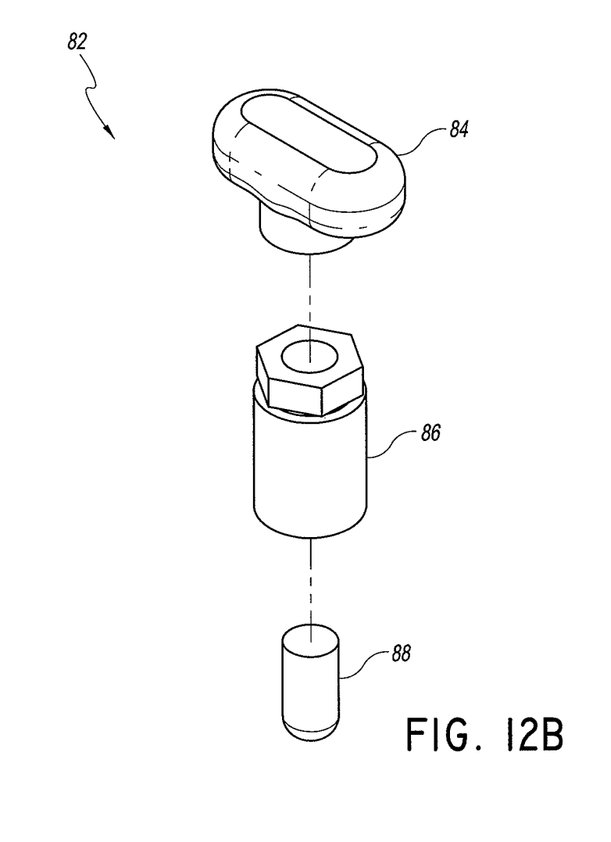
FIG. 12B is an exploded view of the rotatable pin assembly from FIG. 12A.

FIG. 12A is a detail view of a rotatable pin assembly 82 from FIG. 11 that locks the mast 30 in the deployed or raised position. FIG. 12B is an exploded view of the rotatable pin assembly 30 from FIG. 12A. In the illustrated embodiment, the hub 68 receives a portion of the rotatable pin assembly 82. The hub 68 includes a plurality of locking holes 90 that are spaced in an arcuate pattern along an outer edge of the hub 68. The rotatable pin assembly 82 supports a knob 84 that controls a dowel 88. The dowel 88 selectively engages one of the locking holes 90. In this manner, the technician can releasably select the rotational position of the mast 30. The rotatable pin assembly 82 can be further configured to prevent uncontrolled rotation of the mast 30 and potential harm to the technician. In certain embodiments, the rotatable pin assembly 82 is configured to lock the mast 30 at interim angular locations (15, 30, 45, 60, and 75 degrees) if the technician does not release the dowel 88 by pulling the handle 84. The technician pulls out the handle 84 to disengage the dowel 88 from the locking holes 90 and releases (if a spring bias is provided) or pushes the handle 84 to engage the dowel 88 with the locking hole 90. In this way, the mast 30 is prevented from free rotation to the service position under the force of gravity when the mast 30 is not secured to the receiver 26. However, the technician can continue movement of the mast 30 to the service position by actuating the rotatable pin assembly 82 to remove the dowel 88 from the locking holes 90. As mentioned, in certain embodiments the rotatable pin assembly 82 is spring loaded to maintain a locked position. However, various other locking mechanisms can be used to releasably secure the mast 30 in desired positions. For example, a friction brake, spring and ball detent, or the like can be used.

The components described herein of the mast assembly 20 are preferably fabricated of, for example, a galvanized metal to resist corrosion of the mast assembly 20 and to provide sufficient strength to support the mast 30. It will be appreciated, however, that the mast assembly 20 may be fabricated from a variety of other materials such as, for example, stainless steel or a polymer material capable of supporting the mast 30.

It will be appreciated that the mast assembly 20 is constructed to simplify manufacturing, packaging, assembly, installation, and servicing thereof. Although certain features of the mast assembly 20 can be specifically configured for use with an antenna, it will be understood by those of skill in the art that such a mast assembly 20 can be used with other devices, masts or poles as well. Furthermore, the mast assembly 20 described herein can be modified to more effectively cooperate with various types of mast, junction boxes, etc.

Whereas particular embodiments of the invention have been described herein for purpose of illustration, it will be appreciated by those skilled in the art that numerous variations of the details may be made without departing from the invention as described in the appended claims.

What is claimed is:

1. An apparatus for mounting a device comprising:
a base configured to be secured to a supporting surface and having a hub and a receiver spaced from the hub; and
a mast secured to the hub and being configured to support the device, the mast being rotatable in a direction parallel to the base about the hub between a deployed position and a service position, a portion of the mast being securable to the receiver when the mast is in the deployed position and being spaced from the receiver when the mast is in the service position, the receiver being disposed between the hub and the device when the mast is in the deployed position.

2. The apparatus of claim 1, wherein the base includes one or more platforms for attaching the apparatus to a base station, the hub and the receiver being secured to the one or more platforms.

3. The apparatus of claim 2, wherein the base includes one or more guide rails connected to the one or more platforms.

4. The apparatus of claim 3, wherein the one or more guide rails extend between the receiver and the hub.

5. The apparatus of claim 3, wherein an overall length of the one or more guide rails is adjustable between an extended length and a shortened length.

6. The apparatus of claim 3, wherein the one or more platforms includes an intermediate platform, the intermediate platform being disposed between the hub and the receiver.

7. The apparatus of claim 6, wherein the one or more guide rails connects the intermediate platform to the one or more platforms secured to the hub and to the receiver.

8. The apparatus of claim 1, wherein the base includes a channel, and wherein the hub is disposed in the channel so as to be rotatable relative to the channel.

9. The apparatus of claim 8, wherein the channel extends for greater than 180 degrees about a channel axis, and wherein the hub is configured to be slid into the channel parallel to the channel axis.

10. The apparatus of claim 8 further comprising a plurality of hub bolts fastened to the channel, the plurality of hub bolts being disposed so as to prevent at least movement of the hub along the channel axis relative to the base.

11. The apparatus of claim 1, wherein the mast further comprises a shaft, the shaft being disposed so as to engage the hub.

12. The apparatus of claim 11, wherein at least a portion of the shaft passes through the hub.

13. The apparatus of claim 8 further comprising a plate, the plate being secured to the base covering the channel.

14. The apparatus of claim 1 further comprising a rotation lock, the rotation lock being movable between a locked position and an unlocked position, the mast being prevented from rotating from the deployed position to the service position when the rotation lock is in the locked position.

15. The apparatus of claim 1, wherein the mast further comprises one or more junction boxes.

16. An apparatus for mounting a device comprising:
a base configured to be secured to a supporting surface;
a mast rotatably secured to the base at a point and being configured to support the device, the mast being rotatable in a direction parallel to the base between a deployed position and a service position; and
an engagement structure disposed on the base and being selectively engageable with the mast when the mast is in the deployed position, the engagement structure being disposed between the point and the device when the mast is in the deployed position.

17. The apparatus of claim 16, wherein the base includes one or more platforms for attaching the apparatus to a base station, the engagement structure being secured to the one or more platforms.

18. The apparatus of claim 17, wherein the base includes one or more guide rails connected to the one or more platforms.

19. The apparatus of claim 18, wherein the engagement structure is a receptacle defining a passageway therethrough, and wherein a portion of the mast extends through the passageway at least when the mast is in the deployed position.

20. The apparatus of claim 19, wherein the point is a pivot point, and wherein the mast rotates about the pivot point, and wherein the engagement structure is spaced from the pivot point.

21. The apparatus of claim 16, wherein the mast and the base allow free movement of the mast in two planes at the same time.

22. The apparatus of claim 16, wherein the device is an antenna, and further comprising a hub, the hub being connected to the mast and the base.

23. An apparatus for mounting a device comprising:
a generally planar base having a first side and a second side, the first side being configured to be secured to a supporting surface;
a mast rotatably secured to the second side of the base at a point so as to rotate in a direction parallel to the base, the mast being configured to support the device;
a receiver disposed on the base so as to engage with the mast when the mast is in a deployed position, the receiver being located between the point and the device when the mast is in the deployed position; and
a lock disposed on the second side of the base and being selectively engageable with the mast so as to prevent rotation of the mast relative to the base.

24. An apparatus for mounting a device comprising:
a base having a first side;
a rotatable component being secured to the base at a point so as to rotate in a direction parallel to the base, the rotatable component being configured to support a device; and
a non-rotatable component being secured to the base and configured to lock the rotatable component relative to the base, the rotatable component and the non-rotatable component being disposed so that each may be assembled to the first side of the base, the non-rotatable component being disposed on the base so as to receive an intermediate portion of the rotatable component along the length of the rotatable component, the intermediate portion being disposed between the device and the point.

25. The apparatus of claim 24, further comprising a hub, the hub being connected to the rotatable component and the base.

26. The apparatus of claim 25, wherein the hub has an arcuate outer shape, and wherein a rotational axis of the hub intersects the rotatable component.

27. The apparatus of claim 24, wherein the non-rotatable component comprises a housing having a channel therethrough, the non-rotatable component being configured to lock the rotatable component, at least a portion of the rotatable component being is disposed in the channel.

28. The apparatus of claim 24 further comprising a shaft, the shaft being mounted in bearings for rotation relative to the base.

29. The apparatus of claim 26, wherein a circumferential length of the arcuate outer shape is a complete circle.

30. The apparatus of claim 24, wherein the device is an antenna.

31. An apparatus for mounting a device comprising:
a base configured to be secured to a supporting surface and having a hub and a receiver spaced from the hub; and
a mast secured to the hub and being configured to support the device, the mast being rotatable about the hub between a deployed position and a service position, a portion of the mast being securable to the receiver when the mast is in the deployed position and being spaced from the receiver when the mast is in the service position,
wherein the base includes one or more platforms for attaching the apparatus to a base station, the hub and the receiver being secured to the one or more platforms, and wherein the base includes one or more guide rails connected to the one or more platforms, and wherein an overall length of the one or more guide rails is adjustable between an extended length and a shortened length.

* * * * *